United States Patent Office 2,723,557
Patented Nov. 15, 1955

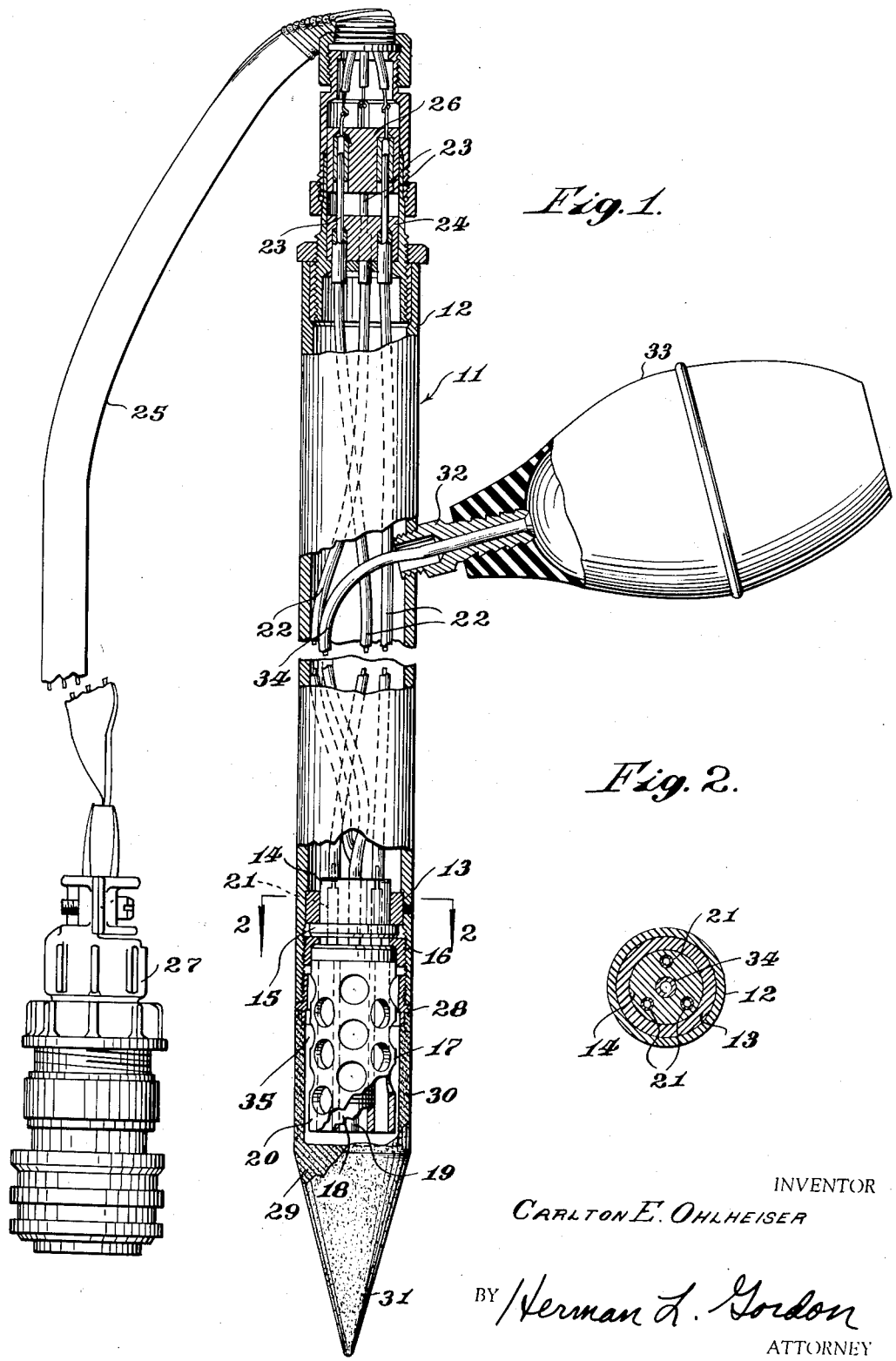

2,723,557
HUMIDITY MEASURING PROBE

Carlton E. Ohlheiser, Silver Spring, Md., assignor to American Instrument Company, Inc., Silver Spring, Md.

Application April 6, 1951, Serial No. 219,700

4 Claims. (Cl. 73—73)

This invention relates to humidity measuring devices, and more particularly to an improved probe device for detecting and measuring moisture in comminuted solid materials or seed material, such as grain or the like.

A main object of the invention is to provide a novel and improved humidity measuring probe which is simple in construction, which involves only a few parts, which is easy to manipulate, and which provides a convenient and accurate means of determining the moisture content of materials such as grain, seeds, comminuted inorganic material such as sand, or other accumulated material of porous character, such as cotton, vegetable fibres, or the like.

A further object of the invention is to provide an improved moisture probe which is inexpensive to manufacture, which involves no moving parts, and which provides true and accurate indications of the moisture content of the material being tested.

A still further object of the invention is to provide an improved moisture testing probe for measuring the moisture content of grain or solid comminuted materials, said probe being compact in size, light in weight, and being suitable for use with portable electrical hygrometry apparatus.

A still further object of the invention is to provide an improved humidity-measuring probe of the electrical type which may be readily employed to measure the moisture content of grain and similar materials, said probe including conveniently operated means for sampling the air in the material being tested and for accurately measuring the moisture in the air, provision being made for sampling the air at a considerable depth in the material and for preventing possible errors due to the different moisture content of the outside air, the sampled air being drawn over the surface of the electrically-responsive sensing element of the probe in a substantially uniformly distributed manner, whereby rapid and accurate indications may be obtained.

Further objects and advantages of the invention will become apparent from the following description and claims, and from the accompanying drawings, wherein:

Figure 1 is a fragmentary side elevational view, partly in longitudinal cross-section, of an improved humidity measuring probe constructed in accordance with the present invention.

Figure 2 is a cross-sectional view taken on line 2—2 of Figure 1.

Referring to the drawings, the humidity measuring probe is designated generally at 11 and comprises an elongated, rigid sleeve member 12 which has rigidly secured in its lower end portion, as viewed in Figure 1, the annular ring member 13. Designated at 14 is a downwardly-facing socket having a peripheral flange 15 which is clamped against ring member 13 by an annular ring nut 16 threadedly engaged inside sleeve member 12. Mounted in socket 14 is a three-prong humidity sensing unit 17 of the electrical type, similar to the TH-1 Humidity Sensing Element manufactured by the American Instrument Company, Inc., of Silver Spring, Maryland, and described in my copending patent application Serial No. 738,441, filed March 31, 1947, for "Humidity Measuring Apparatus." The humidity sensing unit 17 comprises an inner tubular form 18 carrying bifilar-wound conductors covered by a thin layer of hygroscopic material whose electrical conductivity varies in accordance with the moisture content of the air to which it is exposed. Mounted axially inside said form 18 is a temperature-sensitive resistor 19. An apertured plastic outer shell 20 is provided on the unit 17, as shown. As fully described in the above mentioned copending application, the elements of the unit 17 are connected to three prongs 21 which are received in the socket 14. Connected to the terminals of the socket are the insulated conductors 22 which extend upwardly through the sleeve 12 and are connected to the prongs 23 of a conventional male connector unit 24 secured to the top end of the sleeve 12. Designated at 25 is a three-wire flexible cable provided at one end with the conventional female plug 26, engaging and secured to the male plug 24, and provided at its other end with the conventional plug 27 adapted to be connected to the electrical indicator, for example, to a Type MB-1 Battery Operated Portable Indicator, manufactured by the American Instrument Company, Inc., of Silver Spring, Maryland.

Threadedly secured in the lower end of the sleeve 12 is a flanged ring 28, and rigidly secured on said ring is the hollow probe tip 29. Tip 29 is formed of porous metal, such as sintered metal particles, and comprises a cylindrical body portion 30 which surrounds the major portion of the sensing unit 17, and a tapered conical end portion 31, which is tapered substantially to a point to facilitate the insertion of the probe to a considerable depth into a quantity of grain or other material whose moisture content is to be measured.

Secured to the sleeve 12 near its top end is an upwardly and outwardly projecting conduit fitting 32 to which is secured the rubber bulb 33. Designated at 34 is a conduit, such as copper tubing or the like, having one end secured in fitting 32 and extending through the sleeve 12. The other end of conduit 34 extends through and is centrally secured in the socket 14, establishing communication between the rubber bulb 33 and the chamber 35 defined within the spongy metal cylindrical body 30 of tip 29, which contains the humidity-sensing element 17.

In operation, the probe is inserted into the grain, or other material whose moisture content is to be measured, to a considerable depth. The rubber bulb 33 is alternately squeezed and released a number of times to expel the air originally in the chamber 35 and to draw in air from the material surrounding the probe tip 29. The bulb 33 is alternately squeezed and released a sufficient number of times to completely flush chamber 35 with the moisture-laden air around the grain or other material being tested. The porosity of the wall 30 allows a free breathing action, whereby the moisture-laden air completely permeates chamber 35, and whereby the entire surface of the humidity sensing element is uniformly exposed to said moisture-laden air. Said air also passes freely through the cylindrical form 18 around the temperature-sensitive resistor 19, whereby the temperature of the air is measured simultaneously with its moisture content, and whereby the relative humidity of said air may be rapidly determined by the associated indicator, in the manner described in the above-mentioned copending patent application.

It will be noted that the chamber 35 is sealed off from the space in the upper portion of sleeve 12, whereby the air in said upper portion cannot affect the readings obtained by the use of the probe.

Any suitable pump device may be employed in place of the rubber bulb 33. For example, a mechanically operated pump device may be connected to the fitting 32, such as the Brewer Automatic Pipetting Machine, model 120, manufactured by Baltimore Biological Laboratories, Baltimore, Maryland. This pump device is arranged so that it may be adjusted to provide either continuous suction, or alternate suction and exhaust, similar to that produced by the alternate squeezing and releasing of the bulb 33. The use of a mechanical pump device as above described is particularly desirable where the moisture content of the material is tested over a long period of time, or where the probe is employed in conjunction with a recording device or with an automatic humidity control apparatus.

It will be further noted that by providing a breathing action at the porous metal tip 29, said tip is rendered self-cleaning, since small particles of material drawn into the pores of the tip during the suction portion of the breathing cycle will be expelled during the exhaust portion of said breathing cycle.

While a specific embodiment of an improved humidity measuring probe device has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. A humidity-measuring probe comprising an elongated rigid tubular body member, a relatively small hollow tip secured on the end of said body member, a female socket sealingly secured in the end of said tubular body member facing said hollow tip and arranged to seal said tip relative to said body member, a pronged electrical humidity-sensing element mounted in said socket and housed in said hollow tip, said tip being made of spongy metal, a closed flexible bulb secured to said body member, a conduit extending through said body member and socket and connecting the interior of said bulb to the interior of said hollow tip, whereby a breathing action is provided at said tip when said bulb is alternately squeezed and released, to dislodge particles of clogging material from said tip, and a plurality of electrical conductors connected to the terminals of said socket and extending through said tubular body member.

2. A humidity-measuring probe comprising an elongated rigid tubular body member, a relatively small hollow tip secured on one end of said body member, a female socket sealingly secured in said one end of the body member facing said hollow tip and arranged to seal said tip relative to said body member, a pronged electrical humidity-sensing element mounted in said socket and housed in said hollow tip, said tip being made of spongy metal, a closed flexible bulb secured to said body member adjacent the other end of said body member, a conduit extending through said body member and said socket and connecting the interior of said bulb to the interior of said hollow tip, whereby a breathing action is provided at said tip when said bulb is alternately squeezed and released to dislodge particles of clogging material from said tip, and a plurality of electrical conductors connected to the terminals of said socket and extending through said tubular body member.

3. A humidity-measuring probe comprising an elongated rigid tubular body member, a relatively small hollow tip secured on one end of said body member, a female socket sealingly secured in said one end of said body member facing said hollow tip and arranged to seal said tip relative to the body member, a pronged electrical humidity-sensing element mounted in said socket and housed in said hollow tip, said tip being made of spongy metal, a closed flexible bulb secured to said body member adjacent the other end of said body member, a conduit extending through said body member and socket and connecting the interior of said bulb to the interior of said hollow tip, whereby a breathing action is provided at said tip when said bulb is alternately squeezed and released, to dislodge particles of clogging material from said tip, an electrical connector secured in said other end of the body member, and a plurality of electrical conductors extending through said body member and connecting the terminals of said socket to the terminals of said electrical connector.

4. A humidity measuring probe comprising an elongated rigid body member, a relatively small hollow tip secured on the end of said body member, said tip being made of porous rigid material, a humidity-sensing element in said tip, means sealing said tip with respect to the body member, a closed flexible bulb connected to said body member, and a conduit connecting the interior of said bulb to said hollow tip, whereby a breathing action is provided at said tip when said bulb is alternately squeezed and released, to dislodge particles of clogging material from said tip.

References Cited in the file of this patent

UNITED STATES PATENTS

| | | |
|---|---|---|
| 2,105,683 | Burdick | Jan. 18, 1938 |
| 2,151,404 | Gaus et al. | Mar. 21, 1939 |
| 2,381,299 | McCulloch | Aug. 7, 1945 |
| 2,435,632 | Mabey | Feb. 10, 1948 |
| 2,494,628 | Oberding | Jan. 17, 1950 |
| 2,526,636 | Colman | Oct. 24, 1950 |